(12) United States Patent
Akimoto

(10) Patent No.: US 10,558,400 B2
(45) Date of Patent: Feb. 11, 2020

(54) ELECTRONIC APPARATUS SETTING DEVICE AND NON-TRANSITORY RECORDING MEDIUM STORING A COMPUTER READABLE PROGRAM

(71) Applicant: Konica Minolta, Inc., Tokyo (JP)

(72) Inventor: Masao Akimoto, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/828,119

(22) Filed: Nov. 30, 2017

(65) Prior Publication Data

US 2018/0165039 A1 Jun. 14, 2018

(30) Foreign Application Priority Data

Dec. 14, 2016 (JP) .................................. 2016-242734

(51) Int. Cl.
*H04N 1/00* (2006.01)
*G06F 3/12* (2006.01)
*G06F 3/0488* (2013.01)

(52) U.S. Cl.
CPC .......... *G06F 3/1203* (2013.01); *G06F 3/1204* (2013.01); *G06F 3/1231* (2013.01);
(Continued)

(58) Field of Classification Search
CPC .... G06F 3/1285; G06F 3/1205; G06F 3/1288; G06F 3/1253; G06F 3/1203; G06F 3/1231; H04N 2201/0094; H04N 1/00973; H04N 1/00411; H04N 1/0094; H04N 1/00482; H04N 1/32523; H04N 1/0097; H04L 41/0813; H04L 41/0253; H04L 41/0853
See application file for complete search history.

(56) References Cited

U.S. PATENT DOCUMENTS 7,961,761 B2 * 6/2011 Kasatani ............ H04N 1/00344
370/350
8,190,719 B2 * 5/2012 Furukawa ........... H04L 41/0869
370/352
(Continued)

FOREIGN PATENT DOCUMENTS

JP 2010-199665 A 9/2010

*Primary Examiner* — Dismery Mercedes
(74) *Attorney, Agent, or Firm* — Squire Patton Boggs (US) LLP

(57) ABSTRACT

Disclosed is an electronic apparatus setting device, including: a display; a communicator that communicates with a first electronic apparatus and a second electronic apparatus; a controller that receives an operation for the Web panel of the first electronic apparatus, and that receives an instruction for selecting the second electronic apparatus as an apparatus to be set; and a hardware processor that: sets the first electronic apparatus in accordance with a content of the operation; and prepares setting information for carrying out a setting of the second electronic apparatus with a content which is same as the content of the operation, in accordance with the content of the operation when the controller receives the instruction for selecting the second electronic apparatus as the apparatus to be set, wherein the hardware processor carries out the setting of the second electronic apparatus in accordance with the prepared setting information.

7 Claims, 11 Drawing Sheets

(52) U.S. Cl.
CPC .......... *G06F 3/1288* (2013.01); *G06F 3/1291* (2013.01); *H04N 1/00209* (2013.01); *H04N 1/00236* (2013.01); *H04N 1/00411* (2013.01); *H04N 1/00482* (2013.01); *H04N 1/00973* (2013.01); *G06F 3/0488* (2013.01); *H04N 2201/0094* (2013.01)

(56) References Cited

U.S. PATENT DOCUMENTS

| | | | | |
|---|---|---|---|---|
| 8,610,912 | B2* | 12/2013 | Hirose | G06K 15/1859 358/1.13 |
| 9,122,428 | B2* | 9/2015 | Aritomi | G06F 3/1205 |
| 9,426,322 | B2* | 8/2016 | Ito | H04N 1/00973 |
| 9,736,239 | B2* | 8/2017 | Shibata | H04L 67/1095 |
| 9,961,233 | B2* | 5/2018 | Mizuno | G06F 21/45 |
| 9,986,114 | B2* | 5/2018 | Saka | H04N 1/00501 |
| 10,194,003 | B2* | 1/2019 | Imai | H04L 67/42 |
| 2004/0184043 | A1* | 9/2004 | Hirosugi | B41J 2/0457 358/1.1 |
| 2011/0320952 | A1* | 12/2011 | Kataoka | H04L 41/0253 715/735 |
| 2012/0133968 | A1* | 5/2012 | Hirose | G06K 15/1859 358/1.13 |
| 2012/0240029 | A1* | 9/2012 | Sugaya | H04N 1/00204 715/234 |
| 2015/0189116 | A1* | 7/2015 | Ito | H04N 1/00973 358/1.13 |
| 2015/0193674 | A1* | 7/2015 | Ishiguro | G06F 3/1292 358/1.15 |
| 2018/0061370 | A1* | 3/2018 | Ota | G06F 3/1423 |

* cited by examiner

ELECTRONIC APPARATUS SETTING DEVICE AND NON-TRANSITORY RECORDING MEDIUM STORING A COMPUTER READABLE PROGRAM

The entire disclosure of Japanese Patent Application No. 2016-242734 filed on Dec. 14, 2016, is incorporated herein by reference in its entirety.

BACKGROUND

Technological Field

The present invention relates to an electronic apparatus setting device and a non-transitory recording medium storing a computer readable program for setting a plurality of electronic apparatuses.

Description of the Related Art

In general, when a plurality of electronic apparatuses (for example, multi function peripherals (MFPs) or the like) are provided, it is necessary to carry out the setting of the electronic apparatuses one by one. Further, in case that the setting is carried out for each electronic apparatus, when the user interfaces for carrying out the setting are different among the electronic apparatuses, it is required to recognize the difference among the user interfaces to carry out the setting of each electronic apparatus.

On the other hand, the following technology is used. In this technology, the setting of a plurality of electronic apparatuses is carried out by exporting the setting of one electronic apparatus in which the setting is finished, among a plurality of electronic apparatuses, by using a USB (Universal Serial Bus) or via the network, and by importing the exported setting to the other electronic apparatuses. However, it is necessary that the setting item to be set individually (for example, IP (Internet Protocol) address or the like) is still carried out for each electronic apparatus.

Further, the technology for carrying out and managing the common setting of a plurality of electronic apparatuses and the individual setting of each electronic apparatus by using the utility, such as a spreadsheet software, the application for setting the electronic apparatus or the like, is provided.

For example, in Japanese Patent Application Publication No. 2010-199665, by adding the identification information for identifying each setting item as the individual setting or the common setting to each setting item, the setting item to be set individually is displayed on the panel when the setting of another MFP is imported. Therefore, a user is prompted to carry out the input operation for the displayed setting item.

However, in Japanese Patent Application Publication No. 2010-199665, the user interface for the individual setting, which is displayed when the setting of another MFP is imported, is an interface dedicated to the import of the setting, and is different from a user interface which is generally used for the setting of the MFP or the like. Therefore, it is necessary for a user to grasp the method for using the user interface dedicated to the import of the setting in addition to the user interface which is generally used. The technology disclosed in the above Publication is inconvenient for a user.

SUMMARY

One of the objects of the present invention is to provide an electronic apparatus setting device and a non-transitory recording medium storing a computer readable program for effectively setting a plurality of electronic apparatuses by using the user interface which a user is familiar to.

To achieve at least one of the abovementioned objects, according to an aspect of the present invention, an electronic apparatus setting device reflecting one aspect of the present invention, comprises:

a display;

a communicator that communicates with a plurality of electronic apparatuses including a first electronic apparatus which transmits data for instructing the display to display a first Web panel and a second electronic apparatus which transmits data for instructing the display to display a second Web panel, each of the electronic apparatuses having a Web panel function;

a controller that receives an operation for the first Web panel by displaying at least the first Web panel on the display, and that receives an instruction for selecting the second electronic apparatus as an apparatus to be set; and a hardware processor that:

sets the first electronic apparatus in accordance with a content of the operation; and prepares setting information for carrying out a setting of the second electronic apparatus with a content which is same as the content of the operation, in accordance with the content of the operation when the controller receives the instruction for selecting the second electronic apparatus as the apparatus to be set, wherein the hardware processor carries out the setting of the second electronic apparatus in accordance with the prepared setting information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENT

Hereinafter, one or more embodiments of the present invention will be described with reference to the drawings. However, the scope of the invention is not limited to the disclosed embodiments.

Figure 1:
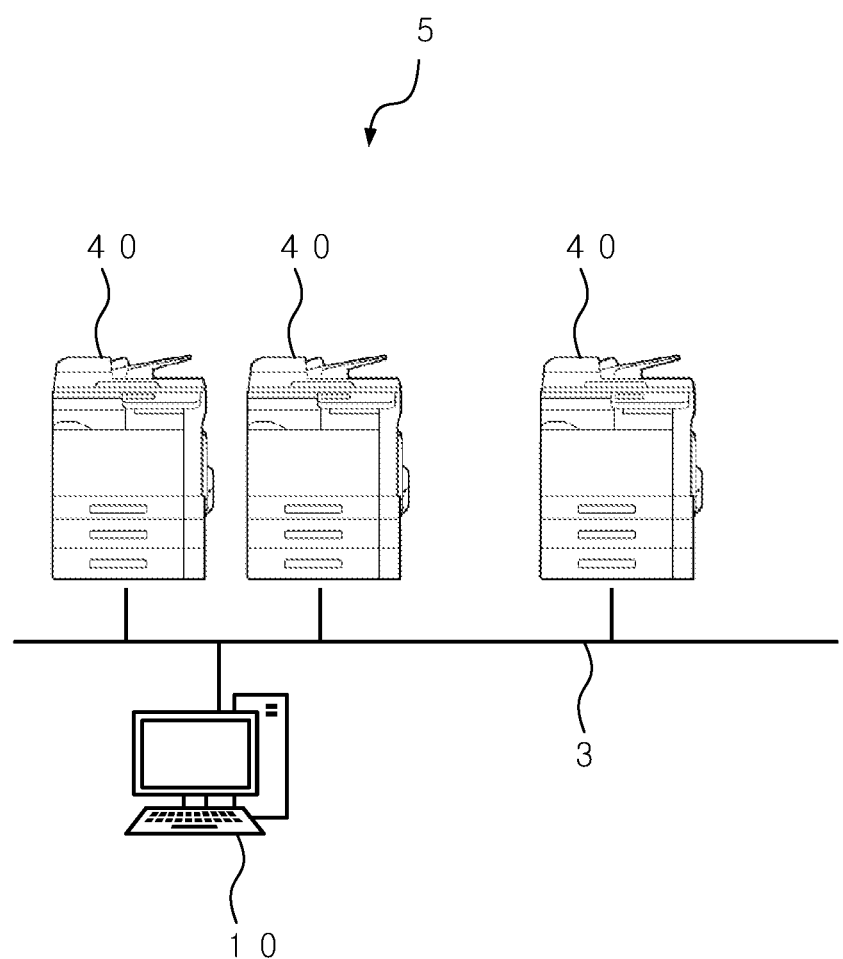
FIG. 1 is a view showing the schematic configuration of the electronic apparatus setting system according to the embodiment.

FIG. 1 shows the schematic configuration of the electronic apparatus setting system 5 according to the embodiment. In the electronic apparatus setting system 5, the PC (Personal Computer) 10 which functions as the electronic apparatus setting device is connected with a plurality of multi function peripherals 40 which are the electronic apparatuses via a wireless or wired network, such as a LAN (Local Area Network) 3 and the like so as to be communicable with each other.

The PC 10 is a computer device, such as a terminal or the like, for managing the multi function peripherals 40. In particular, the PC 10 carries out the setting of each multi function peripheral 40 in accordance with the operation carried out for the Web panel displayed by communicating with the multi function peripherals 40.

In general, the Web panel has the user interface having the setting window which is the same as the setting window displayed on the operation panel 48 (See FIG. 4) of the multi function peripheral 40. By the Web panel, a user can operate the Web panel displayed on the PC 10 like the setting window displayed on the operation panel 48 of the multi function peripheral 40.

The multi function peripheral 40 has the function for executing various types of jobs, such as a copy job for printing out an image of an original on a recording sheet by optically reading the original, a scan job for storing the image data of the read original as a file or the like and/or for transmitting the image data to an external device, a print job for printing out an image on the recording sheet in accordance with the image data received from the PC 10, a facsimile transmission job for transmitting the image data in accordance with the facsimile procedure, and the like. Further, each multi function peripheral 40 has the function for transmitting the data for instructing the PC 10 to display the Web panel, to the PC 10 (Web panel function).

In this embodiment, each multi function peripheral 40 transmits the data for instructing the PC 10 to display the Web panel having the user interface. The user interfaces are different among the multi function peripherals 40. The term "the user interface of the Web panel is different" means that at least one of the configuration elements of the user interface of one multi function peripheral 40, for example, the arrangement and/or the shape of the button and/or the tab which is displayed on the Web panel, the name of the setting item to be set via the Web panel, the hierarchic structure of the setting items to be displayed on the Web panel, and the like, is different from that of another multi function peripherals 40.

Figure 2:
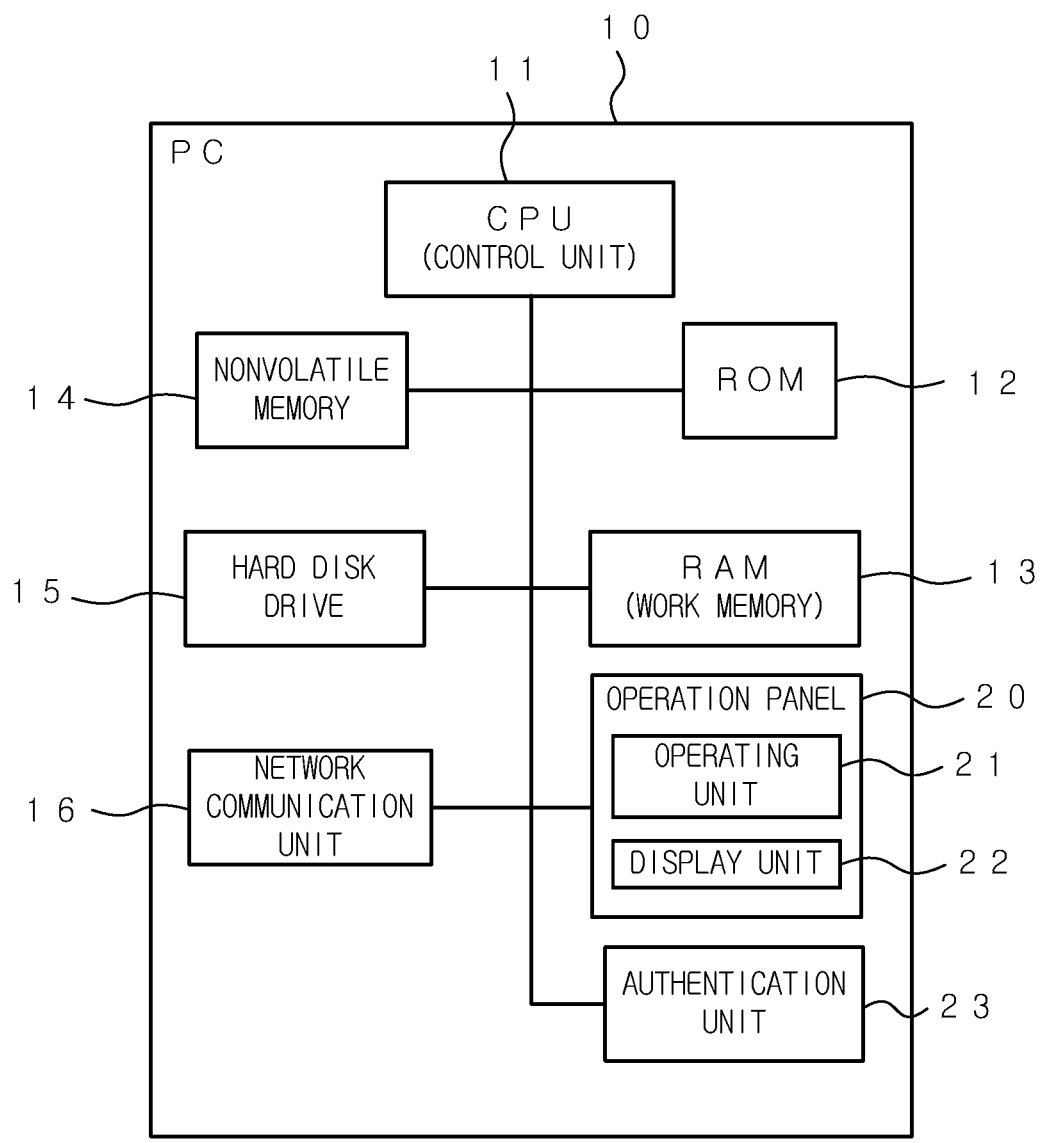
FIG. 2 is a block diagram showing the schematic configuration of the PC as the electronic apparatus setting device according to the embodiment.

FIG. 2 is a block diagram showing the schematic configuration of the PC 10 as the electronic apparatus setting device according to the embodiment. The PC 10 comprises a CPU (Central Processing Unit) 11 for entirely controlling the operation of the PC 10. The CPU 11 is connected with a ROM (Read Only Memory) 12, a RAM (Random Access Memory) 13, a nonvolatile memory 14, a hard disk drive 15, a network communication unit 16, an operation panel 20, an authentication unit 23 and the like via a bus.

By the CPU 11, a middleware, application programs and the like are executed on an OS (Operating System) program as a base.

In the ROM 12, various types of programs are stored. By executing various types of processes by the CPU 11 in accordance with these programs, each function of the PC 10 is realized.

The RAM 13 is used as a work memory for temporarily storing various data when the CPU 11 executes the process in accordance with the programs, and the like.

The nonvolatile memory 14 is a memory (flash memory) in which the stored contents are not damaged even if the PC 10 is turned off, and is used for storing various types of settings.

The hard disk drive 15 is a large-capacity nonvolatile memory device. In the hard disk drive 15, various types of application programs and data are stored.

The network communication unit 16 has the function for communicating with various types of devices, the portable terminals and the like via the network. In particular, the network communication unit 16 functions as the communication unit for communicating with each multi function peripheral 40.

The operation panel 20 comprises an operating unit 21 and a display unit 22. The display unit 22 has the function for displaying various types of operation windows, setting windows and the like. The display unit 22 has a liquid crystal display, a driver thereof and the like. The operating unit 21 has the function for receiving various types of operations from a user. The operating unit 21 comprises various types of hardware keys, such as a start button, a numeric keypad and the like, and a touch screen provided on the display surface of the display unit 22. The touch screen detects the coordinate position on which a user touches the display surface of the display unit 22 to operate the PC 10 by using a touch pen, a user's finger or the like.

In particular, the display unit 22 displays the Web panel in accordance with the data for displaying the Web panel, which is received from each multi function peripheral 40. Further, the operating unit 21 receives the operation for the displayed Web panel by displaying one or more Web panels on the display unit 22, and receives the instruction for selecting the specific multi function peripheral 40 to be set among a plurality of multi function peripherals 40.

The authentication unit 23 authenticates a user who uses the PC 10. For example, the user authentication is executed in accordance with the information which is inputted to the PC 10 by a user and is required for the user authentication (ID, password or the like).

Figure 3:
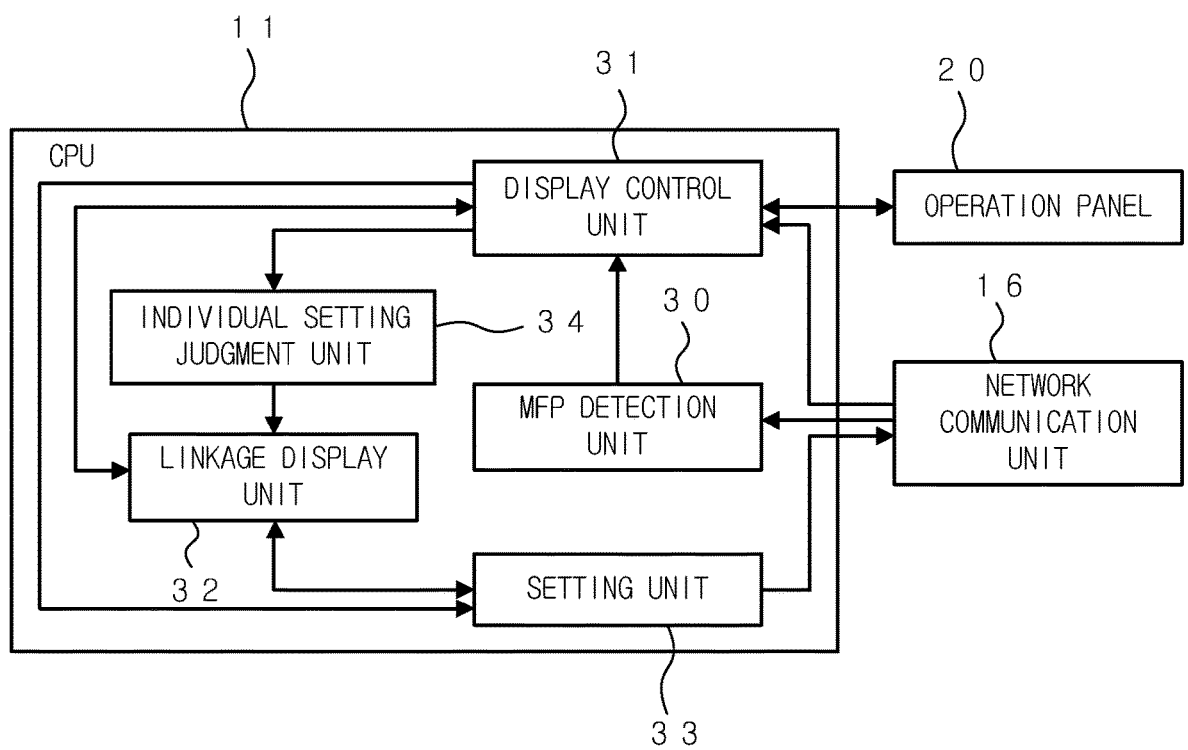
FIG. 3 is an explanatory view for explaining the function for setting the multi function peripheral by using a Web panel function in the CPU, the network communication unit and the operation panel of the PC.

FIG. 3 is an explanatory view for explaining the function for setting the multi function peripheral 40 by using the Web panel function in the CPU 11, the network communication unit 16 and the operation panel 20 of the PC 10.

The CPU 11 has the function as the MFP detection unit 30, the display control unit 31, the linkage display unit 32, the setting unit 33 and the individual setting judgment unit 34.

The MFP detection unit 30 detects each multi function peripheral 40 via the network communication unit 16. Further, the MFP detection unit 30 informs the display control unit 31 of the detected MFP information.

The display control unit 31 obtains the data for displaying the Web panel of each multi function peripheral 40 detected by the MFP detection unit 30 via the network communication unit 16, and controls the operation panel 20 so as to display each Web panel on the display unit 22. Further, the display control unit 31 receives the signal indicating the contents of the operation for the Web panel displayed on the display unit 22, from the operation panel 20, and informs the setting unit 33 of the information for carrying out the setting of the multi function peripheral 40 corresponding to the Web panel for which the operation is carried out, in accordance with the received signal.

The linkage display unit 32 prepares the setting information for carrying out the setting of another multi function peripheral 40 to be set, which is different from the multi function peripheral 40 corresponding to the Web panel for which the operation is carried out, so as to carry out the setting having the same contents as the operation which is carried out for the Web panel, as the setting information preparing unit.

The setting unit 33 receives the information for carrying out the setting of the multi function peripheral 40 corresponding to the Web panel for which the operation is carried out, and carries out the setting of the multi function peripheral 40 corresponding to the above Web panel in accordance with the received information via the network communication unit 16. Further, the setting unit 33 carries out the setting of another multi function peripheral 40 to be set, which is different from the multi function peripheral 40 corresponding to the Web panel for which the operation is carried out, in accordance with the setting information prepared by the linkage display unit 32.

When the individual setting judgment unit 34 receives the signal indicating the contents of the operation which is carried out for the Web panel, from the display control unit 31, the individual setting judgment unit 34 judges whether the setting item to be set in accordance with the contents of the operation is the common setting item or the individual setting item.

Figure 4:
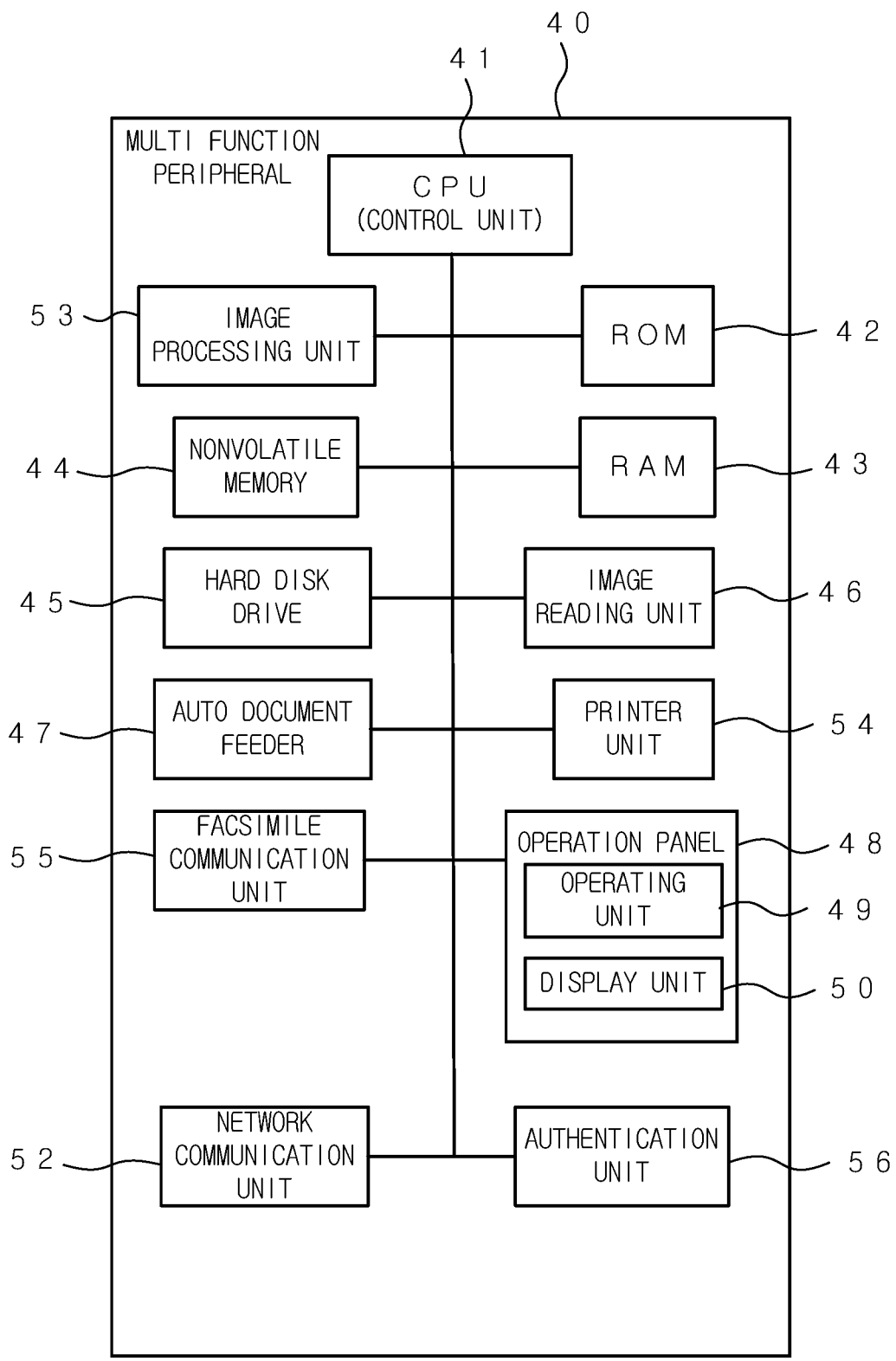
FIG. 4 is a block diagram showing the schematic configuration of the multi function peripheral.

FIG. 4 is a block diagram showing the schematic configuration of the multi function peripheral 40. The multi function peripheral 40 comprises a CPU 41 for entirely controlling the operation of the multi function peripheral 40. The CPU 41 is connected with a ROM 42, a RAM 43, a nonvolatile memory 44, a hard disk drive 45, an image reading unit 46, an auto document feeder (ADF) 47, an operation panel 48, a network communication unit 52, an image processing unit 53, a printer unit 54, a facsimile communication unit 55, an authentication unit 56, and the like via a bus.

By the CPU 41, a middleware, application programs and the like are executed on an OS program as a base. Further, the CPU 41 prepares the data for instructing the PC 10 to display its own Web panel on the operation panel 20 of the PC 10.

In the ROM 42, various types of programs are stored. By executing various types of processes by the CPU 41 in accordance with these programs, each function of the multi function peripheral 40 is realized.

The RAM 43 is used as a work memory for temporarily storing various data when the CPU 41 executes the process in accordance with the programs, as an image memory for storing the image data, and the like.

The nonvolatile memory 44 is a memory (flash memory) in which the stored contents are not damaged even if the multi function peripheral 40 is turned off, and is used for storing various types of settings.

The hard disk drive 45 is a large-capacity nonvolatile memory device. In the hard disk drive 45, various types of application programs and data are stored in addition to the print data, the image data and the like.

The image reading unit 46 has the function for obtaining image data by optically reading an image of an original. For example, the image reading unit 46 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 47 has the function for conveying the original by feeding the original set to the original setting tray from the top sheet one by one, passing the original through the reading position of the image reading unit 46 and discharging the original to a predetermined discharge position. The image reading unit 46 has the function for reading the original set on a platen glass, and has the function for sequentially reading the original which is conveyed by the auto document feeder 47.

The operation panel 48 comprises the operation unit 49 and the display unit 50. The display unit 50 has the function for displaying various types of operation windows, setting windows and the like. The configuration of the display unit 50 is the same as that of the display unit 22 of the operation panel 20 provided in the PC 10. In this embodiment, the user interface for the operation windows, the setting windows and the like, which are displayed on the display unit 50, is the same as the user interface for its own Web panel to be displayed on the operation panel 20 of the PC 10. The operating unit 49 receives various types of operations from a user. The configuration of the operating unit 49 is the same as that of the operating unit 21 of the operation panel 20 provided in the PC 10.

The network communication unit 52 has the function for communicating with the various types of devices, the portable terminals and the like via the network. In particular, the network communication unit 52 communicates with the PC 10, transmits the data for instructing the PC 10 to display its own Web panel and receives the setting request for setting the multi function peripheral 40 from the PC 10.

The image processing unit 53 carries out the rasterizing process for converting print data into image data, the compression/decompression process for the image data, and the like in addition to the processings, such as the enlargement/reduction or the rotation of image data.

The printer unit 54 has the function for forming an image on the recording sheet in accordance with the image data. In this embodiment, the printer unit 54 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The facsimile communication unit 55 has the function for transmitting and receiving the image data to/from an external device having the facsimile function via a telephone line. In particular, the facsimile communication unit 55 transmits the image data to another device having the facsimile function by executing the facsimile transmission job which is set in the multi function peripheral 40.

The authentication unit 56 authenticates the user who uses the multi function peripheral 40. The authentication method may be an optional method using a password, a fingerprint, a vein or the like.

Next, the operation of the electronic apparatus setting system 5 according to the embodiment will be explained.

Figure 5:
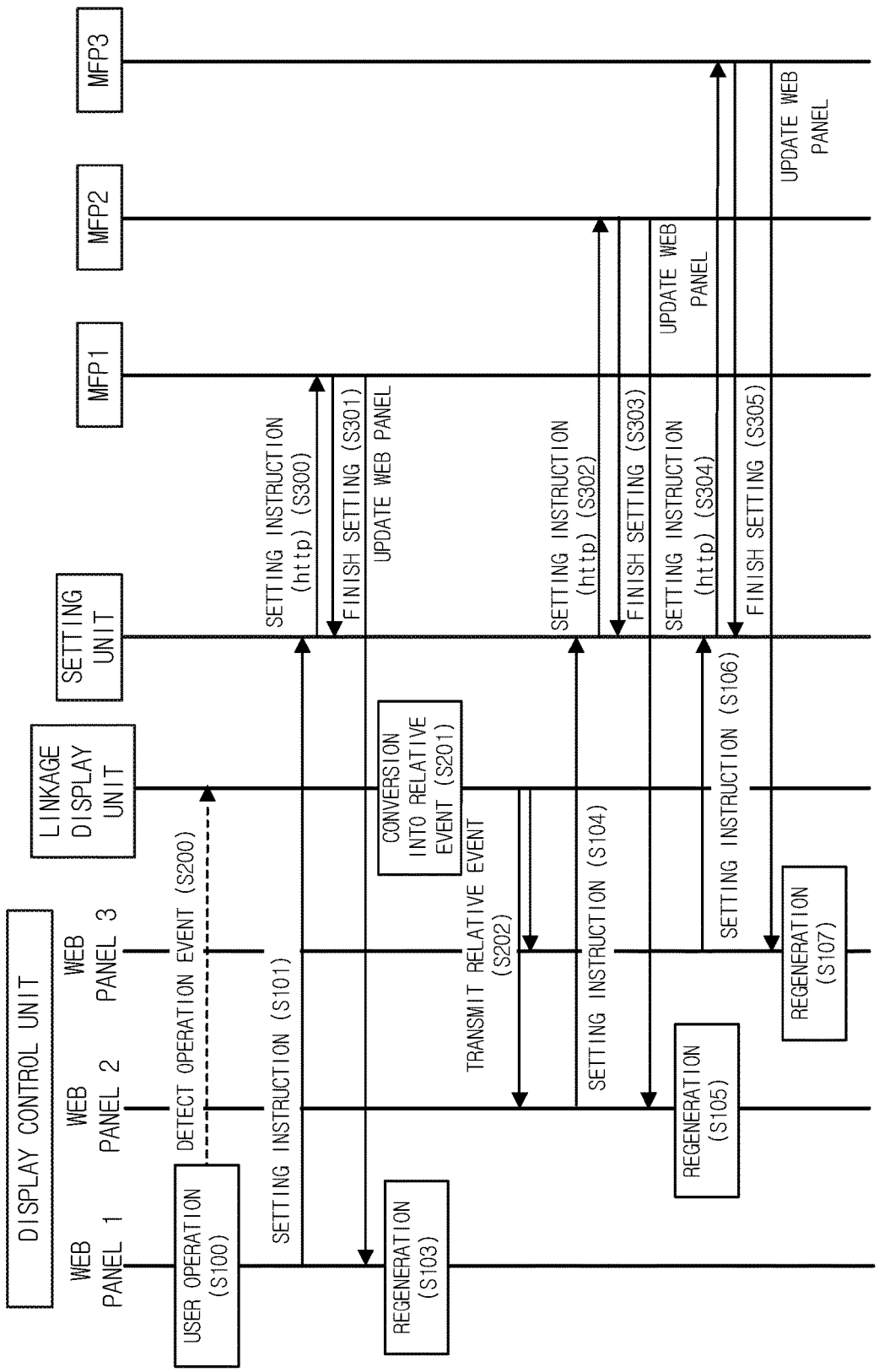
FIG. 5 is a chart diagram showing an example of the operation sequence of the electronic apparatus setting system according to the embodiment.

FIG. 5 shows an example of the operation sequence of the electronic apparatus setting system 5 according to the embodiment. In this example, the number of the multi function peripherals 40 which are detected by the MFP detection unit 30 is three (MFP1, MFP2 and MFP3). Further, the operation panel 20 of the PC 10 displays the Web panel 1 corresponding to MFP1, the Web panel 2 corresponding to MFP2 and the Web panel 3 corresponding to MFP3 by receiving the data for displaying the Web panels compliant with http (Hypertext Transfer Protocol) or the like from each multi function peripheral 40. Further, in this example, all of the multi function peripherals 40 detected by the MFP detection unit 30 are the multi function peripherals to be set. At this time, the operating unit 21 of the PC 10 receives the instruction for selecting all of the multi function peripherals 40 detected by the MFP detection unit 30 as the multi function peripherals to be set, from a user. Alternatively, the operating unit 21 may previously receive the instruction for selecting all of the multi function peripherals 40 detected by the MFP detection unit 30 as the multi function peripherals to be set, and may automatically select all of the multi function peripherals 40 detected by the MFP detection unit 30 as the multi function peripherals to be set when the setting of each multi function peripheral 40 is carried out.

Figure 6:
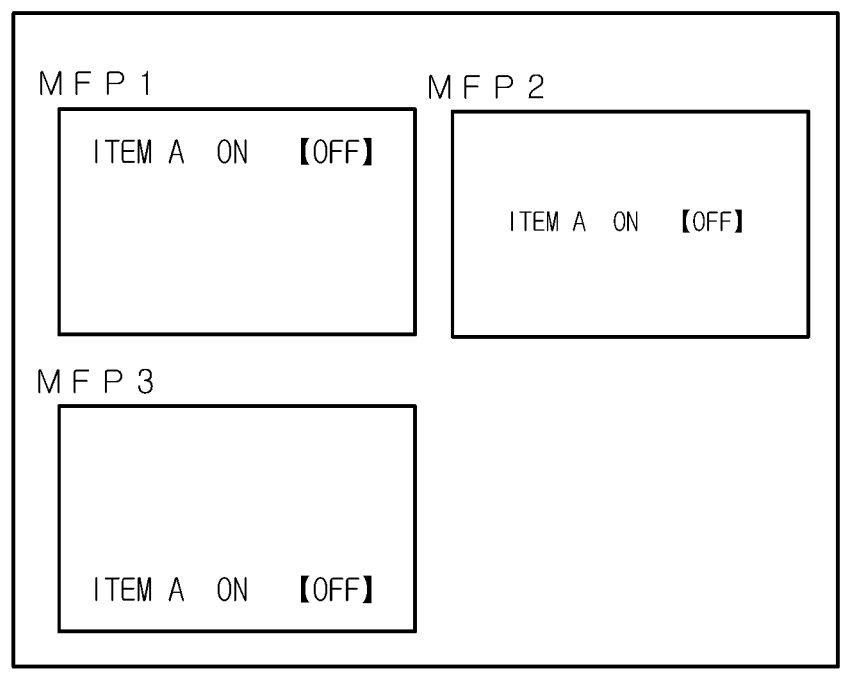
FIG. 6 is a view showing an example of a Web panel of each multi function peripheral, which is displayed on the operation panel.

FIG. 6 shows an example of the Web panel of each multi function peripheral 40, which is displayed on the operation panel 20. In this example, the Web panels of all of the multi function peripherals 40 detected by the MFP detection unit 30 are displayed by the SOAP (Simple Object Access Protocol) or the UPnP (Universal Plug and Play) technology.

Figure 7A:
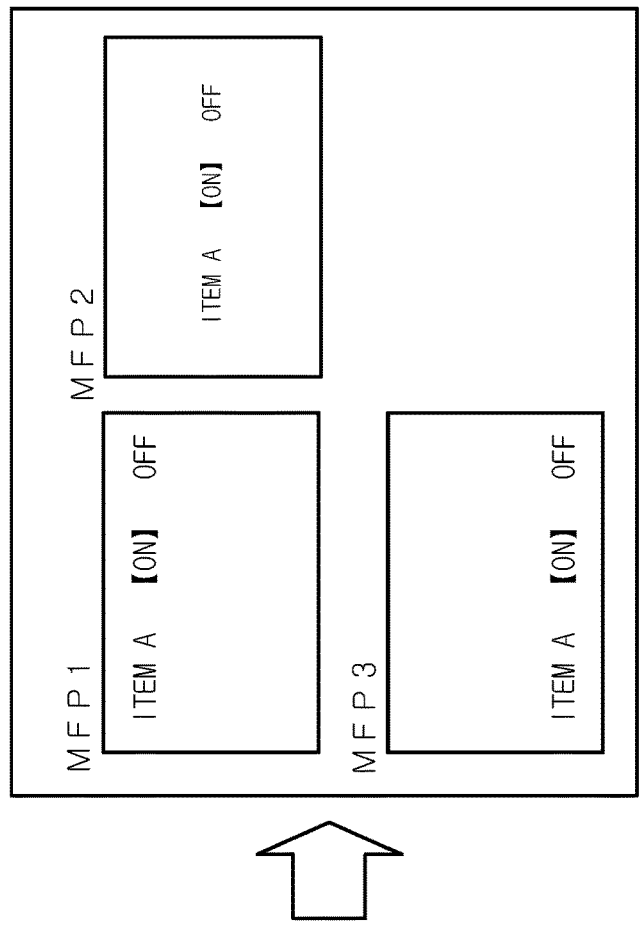
FIGS. 7A and 7B are views showing an example of each Web panel which is displayed at the timing of the setting of the setting item A.
Figure 7B:
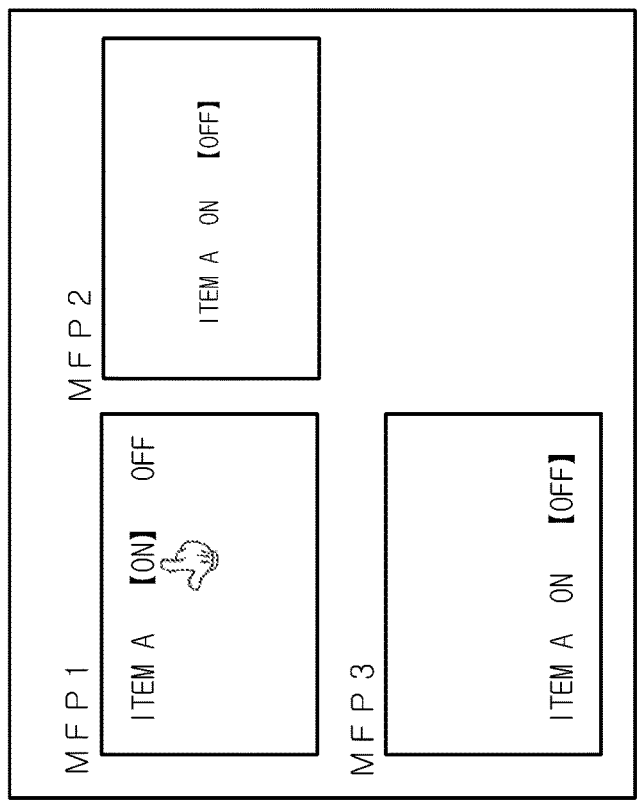

Firstly, as shown in FIG. 7A, a user carries out the operation for the Web panel 1 via the operation panel 20 in order to set the specific setting item (in FIG. 6 and FIGS. 7A to 7C, the item A) for MFP1 (S100 in FIG. 5). In FIGS. 7A to 7C, a user carries out the operation for switching the item A to ON.

The display control unit 31 receives the signal indicating the contents of the operation for the Web panel 1 from the operation panel 20, and informs the setting unit 33 of the information for carrying out the setting of MFP1 corresponding to the Web panel 1 (the information which is necessary for switching the item A to ON) in accordance with the received signal (S101).

The setting unit 33 transmits the setting instruction (the instruction for switching the item A to ON) to MFP1 in accordance with the received information (S300).

When the setting of MFP1 is finished, MFP1 transmits the response indicating that the setting is finished, and transmits the data for instructing the PC 10 to display the Web panel which reflects the changed setting contents, to the PC 10. Then, the setting unit 33 of the PC 10 receives the response indicating that the setting of MFP1 is finished, via the network communication unit 16 (S301). The display control unit 31 regenerates the Web panel 1 on the operation panel 20 so as to reflect the changed setting contents (so as to set the item A to ON) as shown in FIG. 7A (S103).

Further, the linkage display unit 32 monitors the operation for the Web panel displayed on the display unit 22, and when the operation panel 20 receives the operation for the Web panel 1 from a user, the linkage display unit 32 detects the operation event for the Web panel 1 via the display control unit 31 (S200). The detection of the operation event is realized by hooking the event of the window manager, such as qt of the Web panel.

Then, as the setting information preparing unit, the linkage display unit 32 converts the operation event into the relative event as the setting information for carrying out the setting of the multi function peripherals 40 (MFP2 and MFP3) except MFP1, with the same contents as the operation for the Web panel 1 (S201).

This relative event is the operation instruction for operating the Web panels (in this example, Web panel 2 and Web panel 3) which are not directly operated by a user and which have the user interfaces different from that of the Web panel 1, with the same contents as the operation for the Web panel 1. In the conversion process for converting the operation event into the relative event, for example, the setting item of one multi function peripheral 40 (in this example, the item A and the like) is previously related to the setting item of another multi function peripheral 40, which has the same contents as the setting item of one multi function peripheral 40. Further, each option of the setting item of one multi function peripheral 40 (in this example, "ON", "OFF" and the like) is previously related to each option of the setting item of another multi function peripheral 40, which has the same contents as each option of the setting item of one multi function peripheral 40. The linkage display unit 32 recognizes the portion to be operated in another Web panel, from the operation for the Web panel 1 in accordance with the above relation. Then, the linkage display unit 32 prepares the relative event for operating the recognized portion.

The linkage display unit 32 transmits each relative event to the display control unit 31 in order to automatically operate the Web panel 2 and the Web panel 3 with the same contents as the operation for the Web panel 1 (S202). After the Web panel 2 and the Web panel 3 are operated in accordance with the relative event, the display control unit 31 informs the setting unit 33 of the information for carrying out the setting of MFP2 corresponding to the Web panel 2 (the information which is necessary for switching the item A of MFP2 to ON) and the information for carrying out the setting of MFP3 corresponding to the Web panel 3 (the information which is necessary for switching the item A of MFP3 to ON) (S104 and S106).

The setting unit 33 transmits the setting instruction (the instruction for switching the item A to ON) to MFP2 and MFP3 (S302 and S304).

When the setting of MFP2 is finished, MFP2 transmits the response indicating that the setting is finished and the data for instructing the PC 10 to display the Web panel which reflects the changed setting contents, to the PC 10. Similarly, when the setting of MFP3 is finished, MFP3 transmits the response indicating that the setting is finished and the data for instructing the PC 10 to display the Web panel which reflects the changed setting contents, to the PC 10.

Then, the setting unit 33 of the PC 10 receives the response indicating that setting of MFP2 and MFP3 is finished, via the network communication unit 16 (S303 and S305). The display control unit 31 regenerates the Web panel 2 and the Web panel 3 on the operation panel 20 so as to reflect the changed setting contents (so as to set the item A to ON) as shown in FIG. 7B (S105 and S107).

Therefore, by only the operation for the Web panel 1, it is possible to carry out the setting of MFP2 and MFP3 with the same contents as the setting of Web panel 1. Further, by regenerating the Web panel 2 and the Web panel 3 so as to link with the Web panel 1, a user can confirm that the setting of MFP2 and MFP3 is finished.

Next, another example of the operation of the electronic apparatus setting system 5 according to the embodiment will be explained.

Figure 8:
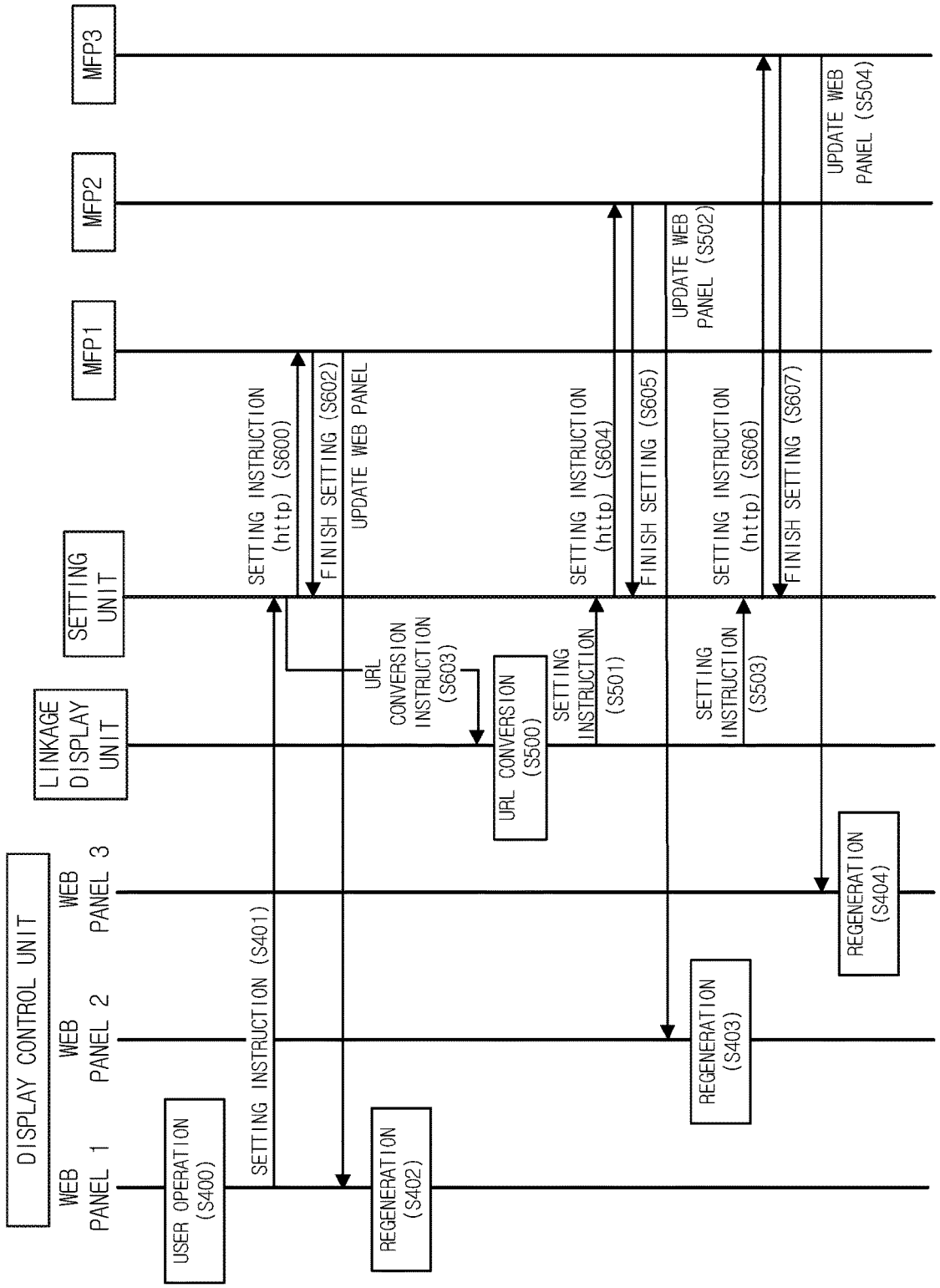
FIG. 8 is a chart diagram showing another example of the operation sequence of the electronic apparatus setting system according to the embodiment.

FIG. 8 shows another example of the operation sequence of the electronic apparatus setting system 5 according to the embodiment. In this example, the number of the multi function peripherals 40 which are detected by the MFP detection unit 30 is three (MFP1, MFP2 and MFP3). Further, the operation panel 20 of the PC 10 displays the Web panel 1 corresponding to MFP1, the Web panel 2 corresponding to MFP2 and the Web panel 3 corresponding to MFP3 by receiving the data for displaying the Web panels compliant with http or the like from each multi function peripheral 40. Further, in this example, all of the multi function peripherals 40 detected by the MFP detection unit 30 are the multi function peripherals to be set. At this time, the operating unit 21 of the PC 10 receives the instruction for selecting all of the multi function peripherals 40 detected by the MFP detection unit 30 as the multi function peripherals to be set, from a user. Alternatively, the operating unit 21 may previously receive the instruction for selecting all of the multi function peripherals 40 detected by the MFP detection unit 30 as the multi function peripherals to be set, and may automatically select all of the multi function peripherals 40 detected by the MFP detection unit 30 as the multi function peripherals to be set when the setting of each multi function peripheral 40 is carried out.

Further, in this example, as shown in FIG. 6, the Web panels of all of the multi function peripherals 40 detected by the MFP detection unit 30, are displayed.

Firstly, a user carries out the operation for the Web panel 1 via the operation panel 20 in order to set the specific setting item for MFP1 (S400).

The display control unit 31 receives the signal indicating the contents of the operation for the Web panel 1 from the operation panel 20, and informs the setting unit 33 of the information for carrying out the setting of MFP1 corresponding to the Web panel 1 in accordance with the received signal (S401).

The setting unit 33 transmits the setting instruction to MFP1 in accordance with the received information (S600).

When the setting of MFP1 is finished, MFP1 transmits the response indicating that the setting is finished, and transmits the data for instructing the PC 10 to display the Web panel which reflects the changed setting contents, to the PC 10. Then, the setting unit 33 of the PC 10 receives the response indicating that the setting of MFP1 is finished, via the network communication unit 16 (S602). The display control unit 31 regenerates the Web panel 1 on the operation panel 20 so as to reflect the changed setting contents (S402).

Further, when the setting unit 33 receives the information for carrying out the setting of MFP1 corresponding to the Web panel 1, the setting unit 33 instructs the linkage display unit 32 to change the setting destination indicated in the setting destination information included in the received information to the multi function peripherals 40 (MFP2 and MFP3) except MFP1 corresponding to the Web panel 1 (S603).

In this example, the setting unit 33 carries out the conversion instruction for converting the URL (Uniform Resource Locator) information as the setting destination information (URL conversion instruction).

When the linkage display unit 32 receives the URL conversion instruction, as the setting information preparing unit, the linkage display unit 32 prepares the setting information in which the setting destination indicated in the URL information received in S603 is converted to MFP2 and MFP3, (S500).

This setting information is information for carrying out the setting of the multi function peripherals 40 (MFP2 and MFP3) except MFP1 with the same contents as the operation for the Web panel 1 by converting the setting destination indicated in the URL information as the setting destination information from MFP1 to MFP2 and MFP3.

Then, the linkage display unit 32 informs the setting unit 33 of the prepared setting information (S501 and S503).

The setting unit 33 transmits the setting instruction to MFP2 and MFP3 in accordance with the prepared setting information (S604 and S606).

When the setting of MFP2 is finished, MFP2 transmits the response indicating that the setting is finished and the data for instructing the PC 10 to display the Web panel which reflects the changed setting contents, to the PC 10 (S502). Similarly, when the setting of MFP3 is finished, MFP3 transmits the response indicating that the setting is finished and the data for instructing the PC 10 to display the Web panel which reflects the changed setting contents, to the PC 10 (S504).

Then, the setting unit 33 of the PC 10 receives the response indicating that setting of MFP2 and MFP3 is finished, via the network communication unit 16 (S605 and S607). The display control unit 31 regenerates the Web panel 2 and the Web panel 3 on the operation panel 20 so as to reflect the changed setting contents (S403 and S404).

Therefore, by only the operation for the Web panel 1, it is possible to carry out the setting of MFP2 and MFP3 with the same contents as the setting of the Web panel 1. Further, by regenerating the Web panel 2 and the Web panel 3 so as to link with the Web panel 1, a user can confirm that the setting of MFP2 and MFP3 is finished.

Next, the operation of the electronic apparatus setting system 5, which is carried out in case that the setting item is the individual setting item, will be explained.

The individual setting item is the setting item in which an improper operation is caused in the control of the system when the same setting is carried out for two or more multi function peripherals 40. Specifically, the IP address (v4/v6) to be assigned when the DHCP (Dynamic Host Configuration protocol) function is disable, the host name, the telephone number for the facsimile, the e-mail address of each multi function peripheral 40, the ID and the password for the mail server, and the like are included. Further, in the individual setting item, for example, the setting item in which even though the same setting is carried out, an improper operation is not caused in the control of the system, but it is preferable that the setting is individually carried out in the management of the system, is included. Specifically, the character ID and the number ID for the facsimile transmission, the machine name, the installment place and the like are included.

In the electronic apparatus setting system 5 according to the embodiment, the above setting items are previously recognized as the individual setting items. Further, the Web panel is controlled so as not to treat the above setting items as the common items.

Figure 9:
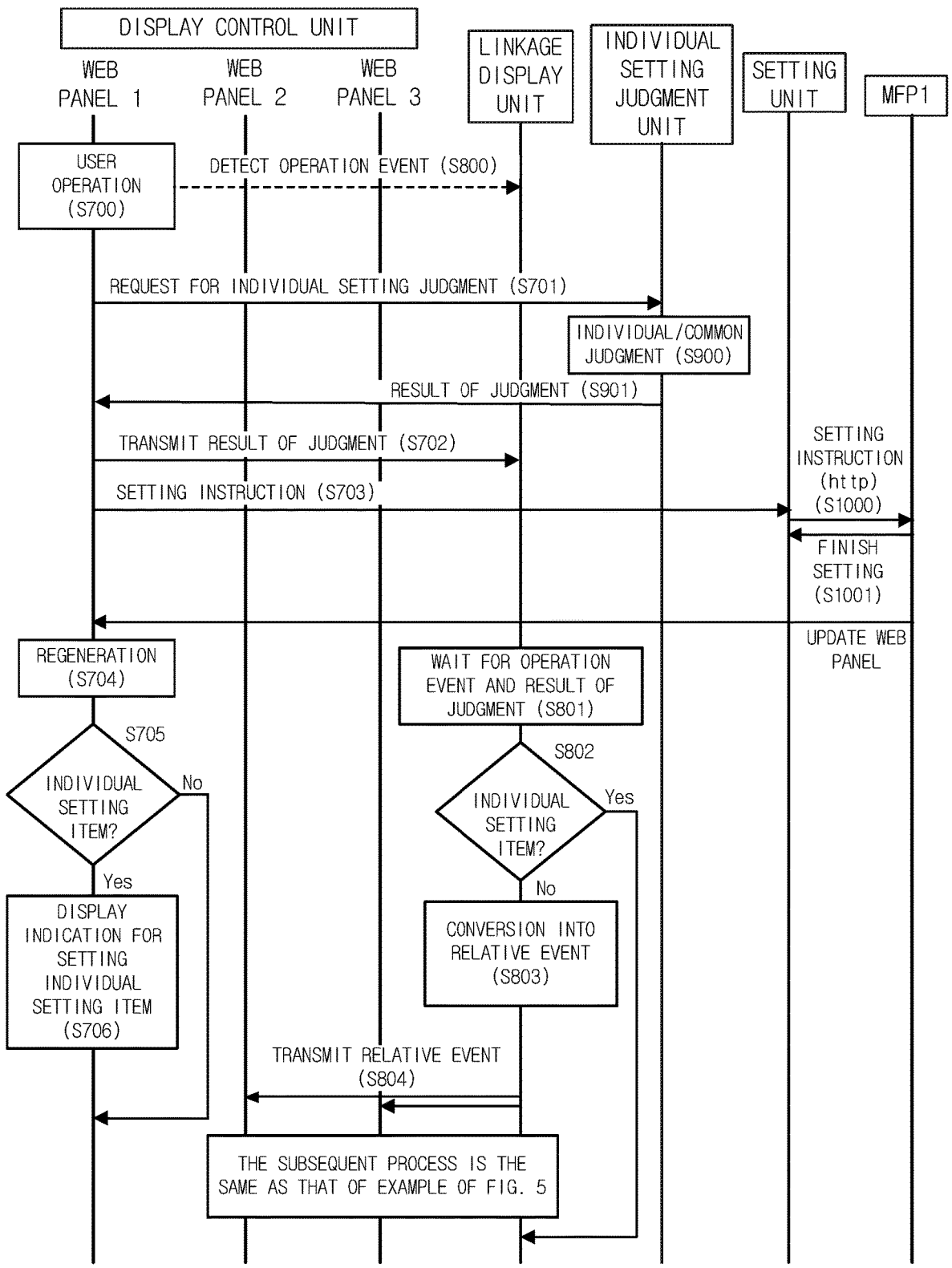
FIG. 9 is a chart diagram showing an example of the operation sequence of the electronic apparatus setting system in case that it is judged whether the setting item to be set is the individual setting item or not.

FIG. 9 shows an example of the operation sequence of the electronic apparatus setting system 5 in case that it is judged whether the setting item to be set is the individual setting item or not. In this example, the number of the multi function peripherals 40 which are detected by the MFP detection unit 30 is three (MFP1, MFP2 and MFP3). Further, the operation panel 20 of the PC 10 displays the Web panel 1 corresponding to MFP1, the Web panel 2 corresponding to MFP2 and the Web panel 3 corresponding to MFP3 by receiving the data for displaying the Web panels compliant with http or the like from each multi function peripheral 40. Further, in this example, all of the multi function peripherals 40 detected by the MFP detection unit 30 are the multi function peripherals to be set. At this time, the operating unit 21 of the PC 10 receives the instruction for selecting all of the multi function peripherals 40 detected by the MFP detection unit 30 as the multi function peripherals to be set, from a user. Alternatively, the operating unit 21 may previously receive the instruction for selecting all of the multi function peripherals 40 detected by the MFP detection unit 30 as the multi function peripherals to be set, and may automatically select all of the multi function peripherals 40 detected by the MFP detection unit 30 as the multi function peripherals to be set when the setting of each multi function peripheral 40 is carried out.

Figure 10A:
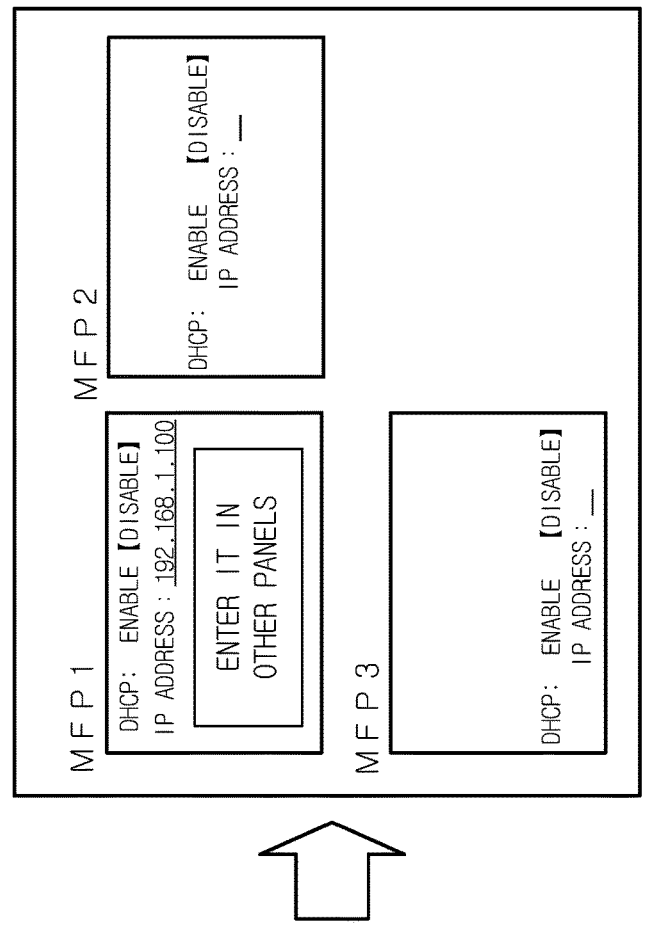
FIGS. 10A and 10B are views showing an example of each Web panel which is displayed at the timing of the setting of the setting item to be set, in case that it is judged that the setting item is the individual setting item.

Further, in this example, as shown in FIG. 10A, the Web panels of all of the multi function peripherals 40 detected by the MFP detection unit 30, are displayed.

Firstly, a user carries out the operation for the Web panel 1 via the operation panel 20 in order to set the specific setting item (in FIGS. 10A and 10B, the IP address) for MFP1 (S700). In FIG. 10A, a user carries out the operation for entering the IP address in the predetermined area.

The display control unit 31 receives the signal indicating the contents of the operation for the Web panel 1 from the operation panel 20, and informs the individual setting judgment unit 34 of the information for carrying out the setting of MFP1 corresponding to the Web panel 1 in accordance with the received signal (S701).

The individual setting judgment unit 34 judges whether the setting item to be set for MFP1 is the individual setting item or the common setting item in accordance with the received information and the individual setting item list which is previously stored (S900). Then, the individual setting judgment unit 34 informs the display control unit 31 of the result of the above judgment (S901).

When the display control unit 31 receives the result of the above judgment from the individual setting judgment unit 34, the display control unit 31 informs the linkage display unit 32 of the above result (S702) and informs the setting unit 33 of the information for carrying out the setting of MFP1 in accordance with the signal indicating the contents of the operation for the Web panel 1 (S703).

The setting unit 33 transmits the setting instruction (in FIGS. 10A and 10B, the setting instruction for setting the IP address) to MFP1 in accordance with the received information (S1000).

When the setting of MFP1 is finished, MFP1 transmits the response indicating that the setting is finished, and transmits the data for instructing the PC 10 to display the Web panel which reflects the changed setting contents, to the PC 10. Then, the setting unit 33 of the PC 10 receives the response indicating that the setting of MFP1 is finished, via the network communication unit 16 (S1001). The display control unit 31 regenerates the Web panel 1 on the operation panel 20 so as to reflect the changed setting contents (so as to display the set IP address) (S704).

Figure 10B:
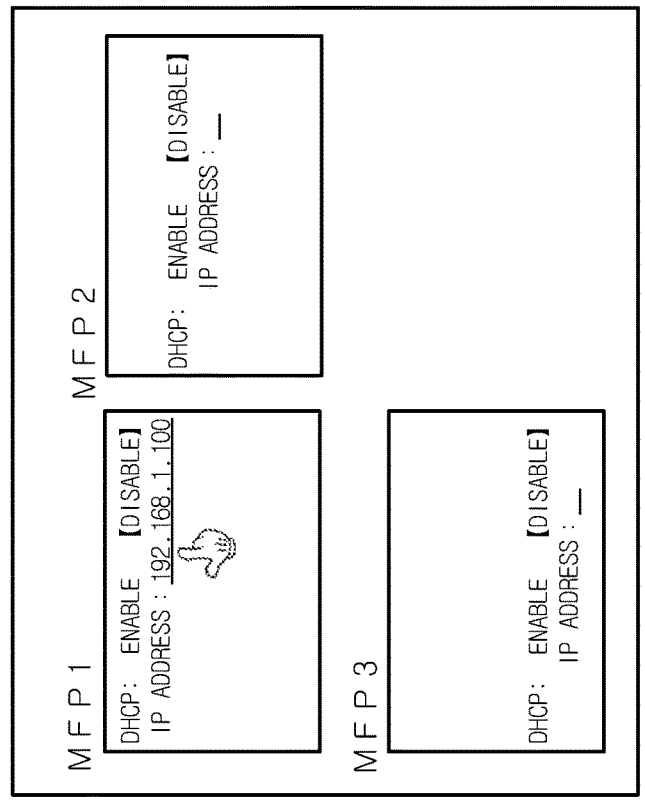

At this time, in case that the setting item which is set for MFP1 is the individual setting item from the result of the judgment in S901 (S705; Yes), the display control unit 31 displays the indication for prompting a user to set this setting item of each multi function peripheral 40 as shown in FIG. 10B (S706).

On the other hand, when the operation panel 20 receives the operation for the Web panel 1 from a user, the linkage display unit 32 detects the operation event for the Web panel 1 via the display control unit 31 (S800), and waits for the result of the judgment for the setting item to be set by the operation corresponding to the detected operation event (S801).

In case that the setting item to be set by the operation corresponding to the detected operation event is the individual setting item in accordance with the result of the judgment, which is transmitted to the linkage display unit 32 in S702 (S802; Yes), the linkage display unit 32 does not convert the detected operation event into the relative event for operating the Web panels (Web panel 2 and Web panel 3) except the Web panel 1.

In case that the setting item to be set by the operation corresponding to the detected operation event is the common setting item (S802; No), as the setting information preparing unit, the linkage display unit 32 converts the operation event detected in S800 into the relative event as the setting information for carrying out the setting of the multi function peripherals 40 (MFP2 and MFP3) except MFP1, with the same contents as the operation for the Web panel 1 (S804).

In the subsequent process, the PC 10 and each multi function peripheral 40 operate as shown in S104, S302, S303, S105, S106, S304, S305 and S107 of FIG. 5.

Therefore, in case that the setting item to be set is the individual setting item, the Web panel 2 and the Web panel 3 are not automatically operated only by the operation for the Web panel 1. As a result, MFP2 and MFP3 are not set. Further, the Web panel 2 and the Web panel 3 are not regenerated so as to link with the Web panel 1.

Next, an example of each Web panel which is displayed when a user sets the individual setting item, will be explained.

Figure 11A:
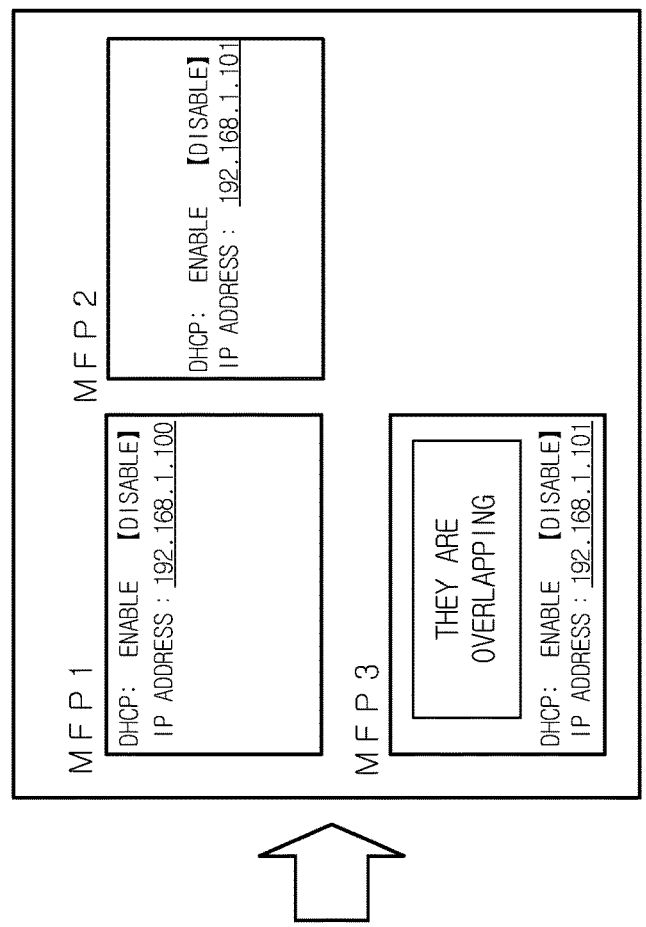
FIGS. 11A and 11B are views showing an example of each Web panel which is displayed at the timing of the setting of the individual setting item.
Figure 11B:
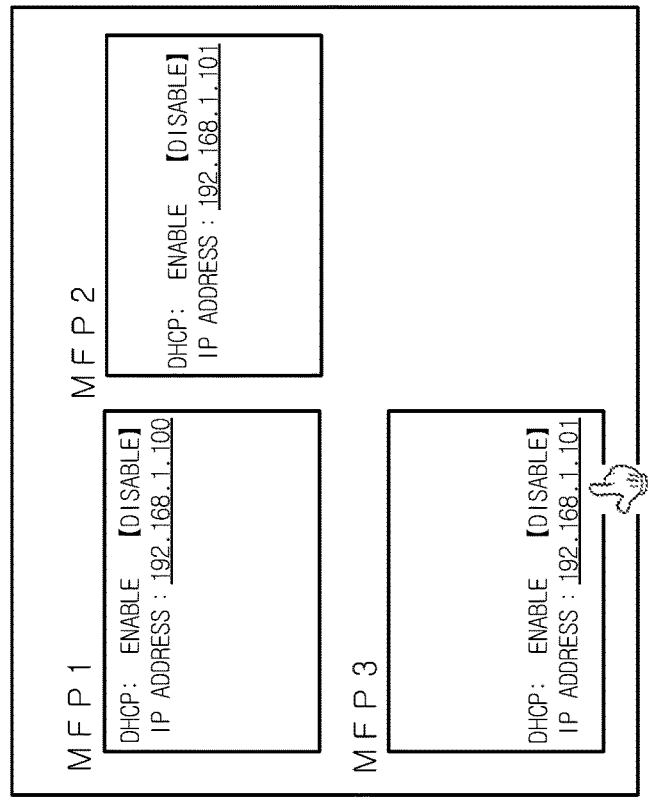

FIGS. 11A and 11B are views showing an example of each Web panel which is displayed at the timing of the setting of the individual setting item.

Firstly, a user enters the set value of the individual setting item (in FIGS. 11A and 11B, the IP address) in each Web panel. At this time, the PC 10 temporarily stores the set value of the individual setting item, which is entered in each Web panel. Then, the CPU 11 detects the entry of the overlapped set value of the individual setting item by comparing the set value of the individual setting item, which is entered in one Web panel, with the set value of the individual setting item, which is entered in another Web panel.

In FIG. 11A, the same IP address is entered in the Web panel 2 corresponding to MFP2 and the Web panel 3 corresponding to MFP3. In this case, the CPU 11 judges that the IP address entered in the Web panel 2 is overlapped with the IP address entered in the Web panel 3, and instructs the operation panel 20 to display the indication for informing a user that the IP addresses are overlapped as shown in FIG. 11B.

Therefore, when the individual setting item is set in each Web panel, it is possible to prevent the overlapped set value from being entered in each Web panel.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the PC 10 instructs the operation panel 20 to display the Web panels of all of the detected multi function peripherals 40. However, for example, only the Web panel which is operated the most easily for a user may be displayed on the operation panel 20. When only this displayed Web panel is operated, it is possible to carry out the setting of the multi function peripherals except the multi function peripheral corresponding to the displayed Web panel with the same contents as the setting which is carried out by this operation for the displayed Web panel.

In this embodiment, the multi function peripherals 40 instruct the PC 10 to display the Web panels having the different user interfaces. However, a plurality of multi function peripherals 40 may instruct the PC 10 to display the Web panels having the same user interface.

Further, in this embodiment, all of the detected multi function peripherals are set by the operation for one Web panel. However, for example, only two or more specific multi function peripherals which are selected as the electronic apparatuses to be set among three or more detected multi function peripherals may be set. In this case, the operating unit 21 receives the selection of the specific multi function peripherals 40 as the electronic apparatuses to be set, and the linkage display unit 32 may prepare the setting information for setting only the above specific multi function peripherals 40.

In FIG. 9, in case that the setting item to be set is the common setting item, the multi function peripherals except the multi function peripheral corresponding to the Web panel which is actually operated are set by converting the detected operation event into the relative event. However, in case that the setting item to be set is the common setting item, for example, as shown in FIG. 8, the multi function peripherals except the multi function peripheral corresponding to the Web panel which is actually operated may be set in accordance with the setting information in which the URL information is converted.

Further, in FIGS. 11A and 11B, the entry of the overlapped set value of the individual setting item is detected by comparing the set value of the individual setting item, which is entered in one Web panel, with the set value of the individual setting item, which is entered in another Web panel. However, the entry of the overlapped set value of the individual setting item may be detected by comparing the set value which has been already set in one electronic apparatus with the set value entered in the Web panel of another electronic apparatus.

Further, in the embodiment, the multi function peripheral is explained as the electronic apparatus. As long as each electronic apparatus instructs the electronic apparatus setting device to display the Web panel and a plurality of electronic apparatuses to be set have the common setting item, the type of the electronic apparatus, such as a copy machine, a facsimile device or the like, is not limited.

Further, in the embodiment, the PC 10 is used as the electronic apparatus setting device. However, the electronic apparatus setting device may be incorporated into any one of a plurality of electronic apparatuses which can communicate with each other.

The present invention may include the program for causing an information processing device to function as the electronic apparatus setting device.

In this embodiment, when the first Web panel displayed on the display is operated, the first electronic apparatus is set in accordance with the content of the operation and the second electronic apparatus corresponding to the second Web panel is automatically set with the content which is the same as the content of the operation.

In this embodiment, when the first Web panel is operated, the first electronic apparatus is set. Further, the second Web panel is automatically operated with the content which is the same as the content of the operation and the second electronic apparatus is set.

In this embodiment, when the first Web panel is operated, the first electronic apparatus is set and the setting information for setting the second electronic apparatus with the same content as the setting carried out for the first electronic apparatus is prepared. Then, the second electronic apparatus is automatically set in accordance with the prepared setting information.

In this embodiment, in case that the setting item to be set is the individual setting item, even though the first Web panel is operated in order to set the above individual setting item, the second electronic apparatus is not automatically set.

In this embodiment, in case that the setting item to be set is the individual setting item, when the setting contents of the individual setting item of one electronic apparatus are overlapped with the setting contents of the individual setting item of another electronic apparatus, a user is informed that the setting contents are overlapped.

In this embodiment, when each electronic apparatus is set by operating the first Web panel, the updated setting contents are displayed on each Web panel.

According to the electronic apparatus setting device and the non-transitory recording medium storing a computer readable program, it is possible to effectively set a plurality of electronic apparatuses by using the user interface which a user is familiar to.

Although embodiments of the present invention have been described and illustrated in detail, the disclosed embodiments are made for purpose of illustration and example only and not limitation. The scope of the present invention should be interpreted by terms of the appended claims.

What is claimed is:

1. An electronic apparatus setting device, comprising:
   a display;
   a communicator that communicates with a plurality of electronic apparatuses including a first electronic apparatus which transmits data for instructing the display to display a first Web panel and a second electronic apparatus which transmits data for instructing the display to display a second Web panel, each of the electronic apparatuses having a Web panel function;
   a controller that receives an operation for the first electronic apparatus for the first Web panel by displaying at least the first Web panel on the display, and that receives an instruction for selecting the second electronic apparatus as an apparatus to be set in the same manner as the first electronic apparatus; and
   a hardware processor that:
   sets the first electronic apparatus in accordance with a content of the operation for the first Web panel;
   prepares setting information to set the second electronic apparatus with a content which is same as the content of the operation for the first electronic apparatus, and in response to the controller receiving an instruction to select the second electronic apparatus as the apparatus to be set,
   carries out the setting of the second electronic apparatus from the display in accordance with the prepared setting information by changing the setting information on the second Web panel on the display to be the same as the setting information on the first Web panel on the display;

wherein:

the hardware processor judges whether a setting item to be set for the first electronic apparatus is a common setting item or an individual setting item;

responsive to the hardware processor judging that the setting item to be set for the first electronic apparatus is the individual setting item, the hardware processor does not prepare the setting information; and in case that the hardware processor judges that the setting item to be set is the individual setting item, when a content of the setting item, which is entered in the Web panel of one electronic apparatus is same as a content of the setting item, which is entered in the Web panel of another electronic apparatus, the hardware processor instructs the display to display an indication for informing a user that the content of the setting item of the one electronic apparatus is the same as the content of the setting item of the another electronic apparatus.

2. The electronic apparatus setting device of claim 1, wherein the hardware processor carries out an operation for the second Web panel in accordance with the setting information, and carries out the setting of the second electronic apparatus in accordance with the operation for the second Web panel.

3. The electronic apparatus setting device of claim 1, wherein the hardware processor prepares the setting information in which a setting destination of a setting for the first electronic apparatus is changed to the second electronic apparatus, and carries out the setting of the second electronic apparatus in accordance with the setting information in which the setting destination is changed.

4. The electronic apparatus setting device of claim 1, wherein the display displays the Web panels indicating a setting status of each electronic apparatus, which is changed by carrying out the setting of each electronic apparatus by the hardware processor.

5. The electronic apparatus setting device of claim 1, wherein the display displays the Web panels of all of the plurality of electronic apparatuses.

6. The electronic apparatus setting device of claim 1, wherein the electronic apparatus setting device is incorporated into one of the plurality of electronic apparatuses.

7. A non-transitory recording medium storing a computer readable program which is executed by an information processing device comprising: a display; a communicator that communicates with a plurality of electronic apparatuses; and a controller that receives an operation for a Web panel which is displayed on the display by at least one of the electronic apparatuses, wherein the program causes the information processing device to function as the electronic apparatus setting device of claim 1.

* * * * *